United States Patent
McDonald

[11] Patent Number: 5,984,990
[45] Date of Patent: Nov. 16, 1999

[54] DUSTFREE WORKBENCH FOR GOLF CLUB SHAFTS INCLUDING UNDERLYING AIR FILTRATION SYSTEM

[76] Inventor: Kevin McDonald, 8781 SE. Sandcastle Cir., Hobe Sound, Fla. 33455

[21] Appl. No.: 09/032,277

[22] Filed: Feb. 27, 1998

[51] Int. Cl.⁶ ............................. B01D 39/16; B01D 50/00
[52] U.S. Cl. ............................. 55/385.1; 55/472; 55/486; 55/524; 55/528; 55/DIG. 18
[58] Field of Search ............................. 55/385.1, 385.2, 55/472, 467, 485, 486, DIG. 18, 524, 527, 528; 108/50.11, 50.18, 161; 454/230

[56] References Cited

U.S. PATENT DOCUMENTS

| | | | |
|---|---|---|---|
| 2,347,334 | 4/1944 | Schmieg | 55/DIG. 18 |
| 3,470,679 | 10/1969 | Ramsey . | |
| 3,518,814 | 7/1970 | Maynard . | |
| 3,686,836 | 8/1972 | Rabilloud . | |
| 4,248,162 | 2/1981 | Skeist | 55/385.1 |
| 4,333,745 | 6/1982 | Zeanwick . | |
| 4,714,647 | 12/1987 | Shipp, Jr. et al. | 55/487 |
| 5,191,852 | 3/1993 | Rupp . | |
| 5,582,225 | 12/1996 | Schank . | |
| 5,807,414 | 9/1998 | Schaefer | 55/DIG. 18 |

*Primary Examiner*—David A. Simmons
*Assistant Examiner*—Robert A. Hopkins
*Attorney, Agent, or Firm*—McHale & Slavin PA

[57] ABSTRACT

This invention pertains to equipment used in the custom fitting of golf clubs and in particular to a dustfree workbench for use by a golfsmith for customizing golf clubs having shafts manufactured from graphite, titanium or beryllium. The workbench includes a filtration system particularly designed for removal of the extremely fine particles generated in the cutting of golf club shafts, and characterized by the use of a series of high efficiency filters that the dust-laden air is passed through before being returned to the room. Grates placed within the upper surface of the workbench prevent larger items from passing therethrough and include dampeners for purposes of flow regulation. The filter assembly comprises a plurality of filter elements with various micron rating filters, referred to as coarse and fine, and assembled in order of decreasing porosity and placed in series and upstream of the blower.

23 Claims, 1 Drawing Sheet

DUSTFREE WORKBENCH FOR GOLF CLUB SHAFTS INCLUDING UNDERLYING AIR FILTRATION SYSTEM

FIELD OF THE INVENTION

This invention pertains to equipment used in the custom fitting of golf clubs and in particular to a dustfree workbench for use by a golfsmith for customizing golf clubs having shafts manufactured from graphite, titanium or beryllium.

BACKGROUND OF THE INVENTION

Golf club construction has evolved over the years to a highly specialized art wherein specialty materials such as titanium, beryllium and graphite are now commonly used in the construction of golf clubs. The use of graphite for golf shaft construction has become an instantaneous success. Graphite, known for its high strength and low weight, permits faster club head speeds which result in longer distance drives for the golfer.

To allow for optimum success, golf clubs can be built so as to be custom tailored to the individual golfer. With a conventional steel shaft golf club, a golfsmith typically employs a workbench having specialized vises to build or customize the club. In many golf shops, this work is performed in front of the customer. One of the problems associated with the machining of these specialty material shafts, particularly graphite, is the amount of specialty material dust, particularly graphite dust that is produced during the building or customizing process. For instance, when a club is tailored to meet the height requirements of an individual, the shaft of the club may need to be cut to fit the particular individual. This cutting process results in a fine dust that is distributed throughout the room and may have possible carcinogenic or other health side effects that the individual and customers are being subjected to. For these reasons, I have improved upon known prior art workbenches to provide the golfsmith with a self-contained workbench to permit continued golf club manufacturing while eliminating the problem of harmful dust fibers, e.g. graphite fiber dust, in the workplace.

For instance, U.S. Pat. No. 3,470,679 disclosed a workbench having a filtered laminar flow of clean air through a filtration system to absorb contaminated air. The platform has a recessed grate for drawing air from around items placed upon the platform.

U.S. Pat. No. 3,518,814 disclosed a workbench having a top working surface and an enclosure which defines an air passageway for movement of air upward through a filter and onto the work area.

U.S. Pat. No. 3,686,836 discloses a workbench having recirculated air drawn across the top of a workbench.

U.S. Pat. No. 4,333,745 discloses a workbench filtering station having HEPA-filters.

U.S. Pat. No. 5,582,225 discloses a simplified workbench that operates via the use of a conventional wet/dry vacuum cleaner for drawing air from a modified workbench.

A common problem with all of the known prior art is that the workbenches are not specifically designed for a golfsmith. To this end, the use of an enclosure over the bench can make it difficult to work on a long club. In addition, most grated workbenches are designed for removal of particulate dust, such as saw dust, and do not possess the air volume necessary to draw the extremely fine fibrous dust, e.g. graphite dust, from the working area. Thus, what is needed is a dustfree workbench having a specific design for removal of graphite fiber dust, or equivalent fine fibrous dust produced from alternative specialty shaft materials, while remaining aesthetically pleasing for use before the golfsmiths' customers.

SUMMARY OF THE INVENTION

Disclosed is a golf club workbench specifically designed for the handling of specialty material golf shafts, particularly graphite-fiber golf shafts. The workbench includes at least two intake grates allowing either left or right hand operation wherein a fixture placed over the workbench and coupled thereto may be used for holding the golf shaft in either a fixed or rotatable position for purposes of cutting the golf shaft to a particular length. In a particularly preferred embodiment, three intake grates are proportionately spaced along the top surface of the workbench. The workbench includes a filtration system particularly designed for removal of the extremely fine particles generated in the cutting of golf club shafts, and characterized by the use of a series of high efficiency filters that the dust-laden air is passed through before being returned to the room. Air is circulated at a rate of between 400 and 1800 cubic feet per minute in such a manner so as to cause a high volume low suction along a majority of the top surface of the workbench wherein the airflow current will not disturb the cutting procedure taking place on the workbench. Grates placed within the upper surface of the workbench prevent larger items from passing therethrough and include dampeners for purposes of flow regulation. The blower used for air recirculation provides a constant volume gas flow through the filters and maintains a selected negative pressure upstream of the blower and a selected positive pressure downstream of the blower. In a particularly preferred embodiment, the blower has a rated capacity of 1340 cfm and is capable of producing an actual flow rate of 600–800 cfm through the filter system. So as to be easily compatible with most environments, the blower is designed to operate at a current of less than 15 amperes, preferably within a range of up to about 7–9 amperes. The amount of noise produced by the workbench is a major concern. Therefore, the blower motor and associated air flow chambers and grates are particularly sized so as to only generate a noise level of up to about 70 decibels. The filter assembly comprises a plurality of filter elements with various micron rating filters, referred to as coarse and fine, and assembled in order of decreasing porosity and placed in series and upstream of the blower. The plurality of filter elements may optionally contain a HEPA-type filter for 99.99% percent particle free air. The coarse and fine filters will precede the HEPA-type filter thereby extending the life thereof. In a particularly preferred embodiment, the filters are comprised of a blend of 100% virgin polyester fibers, formed into a dual density structure and bonded with a fire retardant resin. These filters are preferably manufactured via an air laid process wherein a high loft random web of fibers is created throughout the depth of the media, said material having a minimum media weight of 8.0 ounces per square yard. The media is available in two distinct densities, referred to as coarse and fine, and is optimally arranged so as to maximize both airflow and dust retention. The downstream side of the media is impregnated with a non-oil viscous organic adhesive that is locked into the fibers during the manufacturing process, said adhesive being nondrying, non-migratory and non-evaporative in storage and in use. Coatings that are sprayed, roller coated, or otherwise applied onto an existing dry media are not acceptable. The media is self extinguishing and, in accordance with standards set forth by the American Society of Heating, Refrigerating and Air-Conditioning Engineers, has an average ASHRAE arrestance of 93% and an average ASHRAE efficiency of 20%.

The filters may be positioned vertically or horizontally and are accessible from the front of the workbench and placed in line for ease of removal. In a particularly preferred embodiment, the filters are positioned below the top surface of the workbench and are horizontally disposed within an air flow chamber or extended plenum. The extended plenum is constructed and arranged so as to provide equal suction at all grates while maintaining the filters parallel to the top surface of the workbench, said filters beginning at a distance of about 8 inches beneath the lower surface of said top surface of the bench and continuing in a downward direction toward the blower. The airflow volume is maintained at a particular rate and the particular size and configuration of the filters are chosen so as to provide for the efficient removal of the fibrous dust. This allows the workbench to be placed within a golf shop permitting an operator to customize a golf shaft on the premises. This is particularly advantageous for small organizations where golf club tailoring is necessary but a store does not have sufficient personnel or space to keep workers in an area remote from the area used for servicing customers. Shafts can be cut within the premises allowing the consumer to watch the operation as well as allowing the operator to continue watching the store.

Thus, an objective of the instant invention is to teach a workbench having a particular application for collecting of graphite fiber dust, or equivalent fine fibrous dust produced from alternative specialty shaft materials.

Still another objective of the instant invention is to disclose a golf club workbench having a blower adapted for use for pulling graphite dust or graphite-like-dust, such as that produced from the cutting of titanium or beryllium shafts, from the workbench and circulating the dust containing airstream through high efficiency filters in such volume so as to cause minimal air noise during circulation.

Yet another objective of the instant invention is to disclose a workbench wherein filters are readily accessible along a front panel.

Yet another objective of the instant invention is to disclose a golf club workbench having grates that allow left or right hand operation and can be adjusted so as to increase airflow through the grate.

Yet another objective of the instant invention is to disclose a golf club workbench having filters of a particular media type and arrangement so as to optimally remove the fine graphite dust or graphite-like dust from the airstream.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Figure 1:
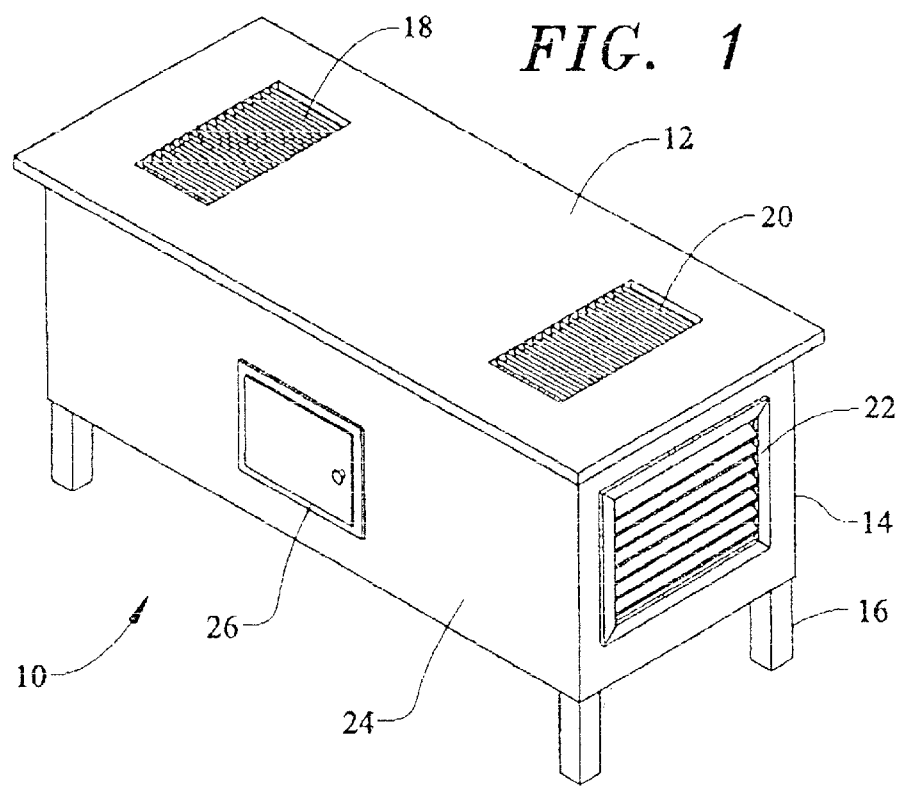
FIG. 1 is a perspective view of the workbench.
Figure 2:
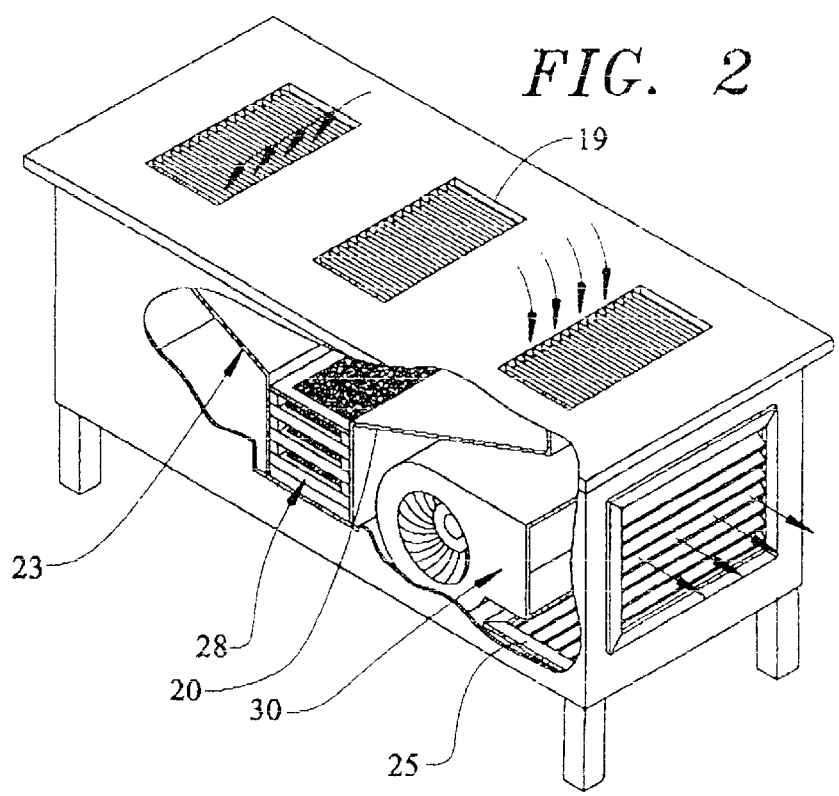
FIG. 2 is prospective view of the workbench showing a particularly preferred embodiment with portions cut away to depict flow patterns.

Now referring to the Figures generally, and FIG. 1 particularly, shown is the workbench 10 of the instant invention having a top surface 12 having a first end edge, a second end edge, and opposing side edges; a base 14 including vertical panels extending from said edges of said top downwardly therefrom to form an enclosure beneath said top supported by legs 16 along each corner of the base. The top surface 12 includes a first grate 18 and a second grate 20 for use in drawing graphite dust or graphite-like dust into the filtration system, comprising a plurality of graphite or graphite-like dust removing filters positioned within the a first air flow chamber 23 (shown in FIG. 2). The grates and underlying air flow chambers or plenums have a specific size and design so as to allow for a high flow of air with minimal noise. This is particularly important for removal of graphite dust which is an extremely light powder that can be carried by the air quite easily. For this reason the grates and underlying plenums cause a large volume of air to move along the top surface 12 of the workbench to be drawn into the base for exiting through exhaust outlet 22. The first air flow chamber 23, as shown in FIG. 2, is formed between said grates and a blower 30, also shown in FIG. 2, said first air flow chamber is operatively associated with said blower to create a constant volume static vacuum to be drawn on said intake grates; a second air flow chamber is fluidly communicated with said blower and said exhaust grate, said second air flow chamber being operatively associated with said blower to create a constant volume pressure to said exhaust grate. It is noted that the exhaust grate is enlarged to provide an uninhibited flow of air for purposes of maintaining the most quiet operation possible. The top work surface may include one or more workpiece holders, for example vises, cutting and grinding implements or any other items either fixed thereon or made portable thereto for the purpose of altering the configuration of the golf shafts, adjustably affixed to said rigid top and positioned proximate said intake grates, said workpiece holder being adapted to positively engage a golf club shaft, thereby allowing said shaft to be cut, by an appropriate cutting blade, to a desired length. A front surface 24 of the base includes an access door 26 which secures the filters therein.

Now again referring to the Figures generally but more specifically referring to FIG. 2, shown is the workbench 10 of the instant invention having a top surface 12 a base 14 supported by legs 16 along each corner of the base. The top surface 12 includes at least a first grate 18 and a second grate 20 for use in drawing graphite or graphite-like dusts into the filtration system. In a particularly preferred embodiment, a third grate 19 is provided. The grates and underlying air flow chambers or plenums have a specific size and design so as to allow for a high flow of air with minimal noise. In the preferred embodiment, the grates 18,19 and 20 are about 8"×12" and have incorporated therein a dampener mechanism which is easily adjustable via integral control arms (not shown). Such grates with integral dampeners are of the type used to control air flow at the outlets of air conditioning or heating ducts, and are readily available. This is particularly important for removal of graphite dust which is an extremely light powder that can be carried by the air quite easily. For this reason the grates and underlying plenums cause a large volume of air to move along the top surface 12 of the workbench to be drawn into the base via the extended plenum 23 mounted beneath the top surface, said extended plenum providing equal suction at all grates. An exhaust outlet 22, is provided for exiting of the filtered air. It is noted, that the exhaust outlet is enlarged so as to provide an uninhibited flow of air thereby providing the quietest possible operation. In a particularly preferred embodiment, an additional exhaust outlet 25 is provided contiguous with the lowermost portion of the base, so as to provide additional exhaust outlet area. As particularly shown at numeral 28, the filters may be positioned horizontally, with the coarsest filter at the top and a finer filter or filters placed beneath and in series therewith. The top work surface may include one or more workpiece holders, for example vises, cutting and grinding implements or any other items either fixed thereon or made portable thereto for the purpose of altering the configuration of the golf shafts, adjustably affixed to said rigid top and positioned proximate said intake grates, said workpiece holder being adapted to positively engage a golf club shaft, thereby allowing said shaft to be cut, by an appropriate cutting blade, to a desired length. A front surface 24 of the base includes an access door 26 which secures the filters therein.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and described in the specification.

What is claimed is:

1. A workbench for the removal of dust generated during the machining of golf club shafts formed from specialty materials selected from the group consisting of graphite, titanium and beryllium, said workbench comprising:

a horizontally disposed rigid top having a first end edge, a second end edge, and opposing side edges;

a support base secured to a bottom surface of said top, said support base including vertical panels extending from said edges of said top downwardly therefrom to form an enclosure beneath said top;

at least two intake grates inserted within said rigid top, one of said grates disposed adjacent to said first end edge and a second grate disposed adjacent to said second end edge;

a blower mounted in said enclosure and characterized as having a rated capacity of up to about 1340 cfm;

a first air flow chamber fluidly communicated with said grates and said blower, said first air flow chamber operatively associated with said blower to create a constant volume static vacuum to be drawn on said intake grates;

an exhaust grate located in one of said vertical panels;

a second air flow chamber fluidly communicated with said blower and said exhaust grate, said second air flow chamber operatively associated with said blower to create a constant volume pressure to said exhaust grate; and a plurality of specialty material dust removing filters positioned within said first air flow chamber; said filters being constructed and arranged so as to maximize both airflow and specialty material dust retention; said filters including a non-oil viscous organic adhesive impregnated on the downstream side thereof and being characterized as having an average arrestance of at least about 93%.

2. The workbench of claim 1, wherein said filters comprise a plurality of filter elements arranged in order of decreasing porosity.

3. The workbench of claim 2, wherein said plurality of filter elements specifically comprise a first coarse filter element and two finer filter elements in series relationship and upstream of said blower.

4. The workbench of claim 1, wherein said filters are comprised of a media formed from a blend of 100% virgin polyester fibers, said fibers formed into a dual density structure and bonded with a fire retardant resin.

5. The workbench of claim 1, wherein said airflow chambers, blower and-exhaust and intake grates, are constructed and arranged so as to maintain a noise level of up to about 70 decibels.

6. The workbench of claim 1, wherein three intake grates are proportionately spaced and inserted within the top surface thereof.

7. The workbench of claim 6 wherein the filters are positioned below the top surface of the workbench and are horizontally disposed within said first air flow chamber, said chamber being constructed and arranged so as to provide equal suction at all grates while maintaining the filters parallel to the top surface of the workbench.

8. The workbench of claim 7, wherein said filters begin at a distance of about 8 inches beneath the lower surface of said top surface of the bench.

9. The workbench of claim 1, wherein the blower is sized so as to produce an actual flow rate in the range of 600–800 cfm.

10. The workbench of claim 1, further including an additional exhaust outlet inserted so as to be contiguous with the lowermost portion of the base.

11. The workbench of claim 1, wherein said plurality of filters further includes a HEPA filter capable of removing up to about 99.99% of the particles.

12. A workbench for the removal of dust generated during the machining of golf club shafts formed from specialty materials selected from the group consisting of graphite, titanium and beryllium, said workbench comprising in combination:

a workpiece holder, adjustably affixed to said rigid top and positioned proximate said intake grates, said workpiece holder being adapted to positively engage a golf club shaft, thereby allowing said shaft to be cut to a desired length;

a horizontally disposed rigid top having a first end edge, a second end edge, and opposing side edges;

a support base secured to a bottom surface of said top, said support base including vertical panels extending from said edges of said top downwardly therefrom to form an enclosure beneath said top;

at least two intake grates inserted within said rigid top, one of said grates disposed adjacent to said first end edge and a second grate disposed adjacent to said second end edge;

a blower mounted in said enclosure and characterized as having a rated capacity of up to about 1340 cfm;

a first air flow chamber fluidly communicated with said grates and said blower, said first air flow chamber operatively associated with said blower to create a constant volume static vacuum to be drawn on said intake grates;

an exhaust grate located in one of said vertical panels;

a second air flow chamber fluidly communicated with said blower and said exhaust grate, said second air flow chamber operatively associated with said blower to create a constant volume pressure to said exhaust grate; and a plurality of specialty material dust removing filters positioned within said first air flow chamber; said filters being constructed and arranged so as to maximize both airflow and specialty material dust retention; said filters including a non-oil viscous organic adhesive impregnated on the downstream side thereof and being characterized as having an average arrestance of at least about 93%.

13. The workbench of claim 12, further including a cutting blade, adapted to sever the shaft at a desired point proximate its engagement with the workpiece holder.

14. The workbench of claim 12, wherein said filters comprise a plurality of filter elements arranged in order of decreasing porosity.

15. The workbench of claim 14, wherein said plurality of filter elements specifically comprise a first coarse filter element and two finer filter elements in series relationship and upstream of said blower.

16. The workbench of claim 12, wherein said filters are comprised of a media formed from a blend of 100% virgin polyester fibers, said fibers formed into a dual density structure and bonded with a fire retardant resin.

17. The workbench of claim 12, wherein said airflow chambers, blower and exhaust and intake grates, are constructed and arranged so as to maintain a noise level of up to about 70 decibels.

18. The workbench of claim 12, wherein three intake grates are proportionately spaced and inserted within the top surface thereof.

19. The workbench of claim 18 wherein the filters are positioned below the top surface of the workbench and are horizontally disposed within said first air flow chamber, said chamber being constructed and arranged so as to provide equal suction at all grates while maintaining the filters parallel to the top surface of the workbench.

20. The workbench of claim 19, wherein said filters begin at a distance of about 8 inches beneath the lower surface of said top surface of the bench.

21. The workbench of claim 12, wherein the blower is sized so as to produce an actual flow rate in the range of 600–800 cfm.

22. The workbench of claim 12, further including an additional exhaust outlet inserted so as to be contiguous with the lowermost portion of the base.

23. The workbench of claim 12, wherein said plurality of filters further includes a HEPA filter capable of removing up to about 99.99% of the particles.

* * * * *